United States Patent
Yang et al.

(10) Patent No.: US 12,518,379 B2
(45) Date of Patent: Jan. 6, 2026

(54) METHOD FOR DETERMINING TOTAL NUMBER OF FIBERS IN MUSCLE TISSUE BASED ON PANORAMIC SCANNING

(71) Applicant: CHINA AGRICULTURAL UNIVERSITY, Beijing (CN)

(72) Inventors: Ning Yang, Beijing (CN); Shuang Gu, Beijing (CN); Chaoliang Wen, Beijing (CN); Congjiao Sun, Beijing (CN)

(73) Assignee: China Agricultural University, Beijing (CN)

( * ) Notice: Subject to any disclaimer, the term of this patent is extended or adjusted under 35 U.S.C. 154(b) by 498 days.

(21) Appl. No.: 18/156,072

(22) Filed: Jan. 18, 2023

(65) Prior Publication Data

US 2024/0161277 A1  May 16, 2024

Related U.S. Application Data

(63) Continuation of application No. PCT/CN2022/131927, filed on Nov. 15, 2022.

(51) Int. Cl.
*G06T 7/00* (2017.01)
*G01N 1/30* (2006.01)
(Continued)

(52) U.S. Cl.
CPC .......... *G06T 7/0012* (2013.01); *G01N 1/30* (2013.01); *G06T 3/40* (2013.01); *G06T 7/11* (2017.01);
(Continued)

(58) Field of Classification Search
CPC . G06T 7/0012; G06T 3/40; G06T 7/11; G06T 2207/10056; G06T 2207/30024;
(Continued)

(56) References Cited

U.S. PATENT DOCUMENTS

| | | | | |
|---|---|---|---|---|
| 5,925,400 A | * | 7/1999 | Gundlach | A23L 13/77 426/480 |
| 2005/0085790 A1 | * | 4/2005 | Guest | A61M 25/0041 604/116 |

(Continued)

OTHER PUBLICATIONS

Reyes-Fernandez PC, Periou B, Decrouy X, Relaix F, Authier FJ. Automated image-analysis method for the quantification of fiber morphometry and fiber type population in human skeletal muscle. Skelet Muscle. May 27, 2019; (Year: 2019).*

(Continued)

*Primary Examiner* — Chineyere Wills-Burns
*Assistant Examiner* — Lucius Cameron Gree Allen
(74) *Attorney, Agent, or Firm* — Edell, Shapiro & Finnan, LLC (57) ABSTRACT

A method for determining a total number of fibers in a muscle tissue based on panoramic scanning is described. A muscle tissue slide is panoramically scanned to obtain a panoramic digital slide using a panoramic scanner, and the panoramic digital slide obtained is segmented, counted and summed to realize the statistical effect on the total number of fibers in the muscle tissue; compared with dependence on an optical microscope, 5-10 fields of view of an image are represented as histological characteristics of the muscle fiber of an biological individual, and further compared with a method using a product of average muscle fiber density and muscle slide area as an estimated value of the total number of fibers of the slide, the present disclosure can realize full-field statistics of the muscle tissue, with a smaller error and a more accurate result.

16 Claims, 6 Drawing Sheets

(51) Int. Cl.
  *G06T 3/40* (2024.01)
  *G06T 7/11* (2017.01)
  *G06V 20/68* (2022.01)

(52) U.S. Cl.
  CPC .............. *G06T 2207/10056* (2013.01); *G06T 2207/30024* (2013.01); *G06T 2207/30242* (2013.01)

(58) Field of Classification Search
  CPC ............ G06T 2207/30242; G01N 1/30; G06V 20/68; Y02A 40/70
  USPC .......................................................... 382/133
  See application file for complete search history.

(56) References Cited

U.S. PATENT DOCUMENTS

2018/0360054 A1\* 12/2018 Hanning ................. A22B 5/007
2022/0096394 A1\* 3/2022 Li ........................... A61K 31/05
2024/0344275 A1\* 10/2024 Bernié .................. G06T 7/0004

OTHER PUBLICATIONS

Charlotte Rehfeldt et al. Number and Size of MuscleFibres in Relation to Meat Production, Department of Veterinary Basic Sciences, The Royal Veterinary College, 2004 (Year: 2004).\*

FFPE Samples—Human Tissue Specimen Preparation, 2018, Lab-Ally (Year: 2018).\*

Weiran Huo, Kaiqi Weng, Tiantian Gu, Yu Zhang, Yang Zhang, Guohong Chen, Qi Xu, Effect of muscle fiber characteristics on meat quality in fast- and slow-growing ducks, Poultry Science, vol. 100, Issue 8, (Year: 2021).\*

Kaiqi Weng, Weiran Huo, Tiantian Gu, Qiang Bao, Li-e Hou, Yu Zhang, Yang Zhang, Qi Xu, Guohong Chen, Effects of marketable ages on meat quality through fiber characteristics in the goose, Poultry Science, vol. 100, Issue 2, (Year: 2021).\*

Yongbo Cui, Haematoxylin Eosin (H&E) staining, Jun. 18, 2017, Springer Nature, (Year: 2017).\*

Geoffrey Rolls, An Introduction to Specimen Processing, Feb. 10, 2022, Leica Biosystems (Year: 2022).\*

Yin X, Wu Y, Zhang S, Zhang T, Zhang G, Wang J. Transcriptomic profile of leg muscle during early growth and development in Haiyang yellow chicken. Arch Anim Breed. Sep. 20, 2021;64(2):405-416. doi: 10.5194/aab-64-405-2021. PMID: 34584942; PMCID: PMC8461557. (Year: 2021).\*

Birkl C, Soellradl M, Toeglhofer AM, Krassnig S, Leoni M, Pirpamer L, Vorauer T, Krenn H, Haybaeck J, Fazekas F, Ropele S, Langkammer C. Effects of concentration and vendor specific composition of formalin on postmortem MRI of the human brain. Magn Reson Med. Feb. 2018; (Year: 2018).\*

Mayeuf-Louchart, A., Hardy, D., Thorel, Q. et al. MuscleJ: a high-content analysis method to study skeletal muscle with a new Fiji tool. Skeletal Muscle 8, 25 (2018). (Year: 2018).\*

Sullivan-Brown, J., Bisher, M. & Burdine, R. Embedding, serial sectioning and staining of zebrafish embryos using JB-4 resin. Nat Protoc 6, 46-55 (2011). (Year: 2011).\*

\* cited by examiner

Collect and fix a fresh muscle tissue in 4% paraformaldehyde, and transversely section to prepare a paraffin-embedded H&E-stained muscle slide Scan the muscle slide on an automatic pathology slide scanner, and save the scanned panoramic slide image Open the panoramic slide image, observe the histomorphology of muscle fibers, and output panoramic muscle fiber images or those at different magnification powers Segment a panoramic muscle fiber image in software to output N images Determine the numbers of fiber in N images, where a sum of the numbers is the total number of muscle fibers of the panoramic slide

METHOD FOR DETERMINING TOTAL NUMBER OF FIBERS IN MUSCLE TISSUE BASED ON PANORAMIC SCANNING

CROSS-REFERENCE TO RELATED APPLICATION

This application is a continuation of International Application No. PCT/CN2022/131927, filed Nov. 15, 2022, the disclosure of which is incorporated herein by reference in its entirety.

TECHNICAL FIELD

The present disclosure relates to the technical field of muscle fiber, in particular to a method for determining a total number of fibers in a muscle tissue based on panoramic scanning.

BACKGROUND

With the improvement of living standard, people place higher demands on livestock and poultry meat products, namely, the pursuit of better meat quality. Muscle fiber and the histological morphology are important measurement indexes of meat quality. Common muscle fiber and the histological morphology include the total number of fibers, muscle fiber diameter, area of muscle fiber, area ratio of muscle fiber, and average muscle fiber density, which are closely related to the mouthfeel of meat products. In livestock and poultry breeding, accurate evaluation of muscle fiber development status and the total number of fibers in muscle is of great significance to cultivate high quality broiler breeds that meet people's needs.

However, in the existing statistical method of muscle fiber and the histological morphology, well-prepared muscle slides are usually placed and observed under an optical microscope at a magnification, and 5-10 fields of view of an image are selected for photographing and muscle fiber and the histological morphology are statistically analyzed in image processing software. The above 5-10 fields of view of the image are all randomly selected, and their average represent the muscle fiber and histological morphology of the biological individual as a technical repetition of a biological individual. For example, the product of average muscle fiber density and muscle section area is regarded as an estimated value of the total number of fibers of the section. This method uses limited fields of view of the image as a representative of a biological individual, which has a limitation of statistical accuracy. Muscle fiber density obtained by conventional methods is not representative. Thus, there is a large deviation between the total number of fibers estimated by multiplying the muscle fiber density by section area and the actual total number of fibers.

SUMMARY

The objective of the present disclosure is to provide a method for determining a total number of fibers in a muscle tissue based on panoramic scanning. The total number of fibers in a muscle tissue determined by the method is closer to actual one, with a smaller error and a more accurate result.

The present disclosure provides a method for determining a total number of fibers in a muscle tissue based on panoramic scanning, including the following steps:

panoramically scanning a muscle tissue slide to obtain a panoramic digital slide using a panoramic scanner; magnifying the panoramic digital slide, and segmenting the panoramic digital slide into N images along the space of muscle fiber bundles, where N is an integer greater than 1; and determining a number of fibers in each image, where a sum of numbers of fibers in the N images is the total number of fibers in the muscle tissue.

Preferably, a magnification power may be in the range of 1× to 80×.

Preferably, the muscle tissue may include muscle tissues of livestock and poultry animals and model animals.

Preferably, the livestock and poultry animals may include chickens, pigs, cattle, goats/sheep, ducks, or geese; and preferably, the model animals may include mice or rats.

Preferably, a muscle development period of the chickens may include a myogenic period and a muscle maturation period.

Preferably, the muscle tissue may be one or more selected from the group consisting of pectoralis, thigh/leg muscle, longissimus dorsi, gastrocnemius, and biceps femoris.

Preferably, the muscle tissue slide may be a hematoxylin-eosin (H&E) stained slide.

Preferably, the muscle tissue slide is prepared according to the following steps:

successively subjecting a fresh muscle tissue to fixation with a first fixing solution, block trimming, and fixation with a second fixing solution to obtain a fixed sample; and successively subjecting the fixed sample to a first dehydration, a first permeabilization, embedding, sectioning, section stretch, deparaffinization and rehydration, hematoxylin staining, water washing, rinsing, a second dehydration, eosin counterstaining, a third dehydration, a second permeabilization, and mounting to obtain the muscle tissue slide.

Preferably, if the fresh muscle tissue is a muscle tissue in the myogenic period, the first dehydration may include the following procedure: successively soaking the fixed sample in 20% vol ethanol for 1 h, 30% vol ethanol for 1 h, 40% vol ethanol for 1 h, 50% vol ethanol for 1 h, 60% vol ethanol for 1 h, 70% vol ethanol for 12 h, 80% vol ethanol for 3 h, 95% vol ethanol for 3 h, 95% vol ethanol for 3 h, and 95% vol ethanol for 3 h.

Preferably, if the fresh muscle tissue is a muscle tissue in the muscle maturation period, the first dehydration may include the following procedure: successively soaking the fixed sample in 70% vol ethanol for 3 h, 85% vol ethanol for 3 h, 95% vol ethanol for 3 h, 95% vol ethanol for 3 h, 100% vol ethanol for 3 h, 100% vol ethanol for 3 h, and 100% vol ethanol for 2 h.

Preferably, the first fixing solution may be a 4 wt. % paraformaldehyde fixing solution, and fixation time may be >48 h.

Preferably, the fresh muscle tissue and the paraformaldehyde fixing solution may be in a volume ratio of <1:10.

Preferably, the second fixing solution may be a 4% vol formalin, and the fixation time may be >1 day.

Preferably, a cross-section thickness of a muscle block obtained by the block trimming may be 1-4 mm.

Preferably, the slide may be 1-4 μm in thickness.

The present disclosure further provides use of the method according to the foregoing technical solution in any one or more of meat quality evaluation, livestock and poultry breeding, and scientific research on livestock and poultry meat quality.

The Present Disclosure has the Following Beneficial Effects

The present disclosure provides a method for determining a total number of fibers in a muscle tissue based on panoramic scanning. In the method, a muscle tissue slide is panoramically scanned to obtain a panoramic digital slide using a panoramic scanner, and the panoramic digital slide obtained is segmented, counted and summed to realize the statistical effect on the total number of fibers in the muscle tissue; compared with dependence on an optical microscope, 5-10 fields of view of an image are represented as the histological morphology of the muscle fiber of an biological individual, and further compared with a method using a product of average muscle fiber density and muscle slide area as an estimated value of the total number of fibers of the slide, the present disclosure can realize full-field statistics of the muscle tissue, with a smaller error and a more accurate result.

Meanwhile, the present disclosure may achieve batch processing of slides, abandoning the practice that conventional H&E slides have to be observed under an optical microscope. Panoramic digital muscle slides can be opened and browsed in display terminal software, and muscle fiber images are observed. This leads to more convenient morphologic observation of muscle fibers and tissues.

Furthermore, compared with observation, movement of the field of view, manual focusing, connection with a camera for photographing, and image output under a conventional microscope, the present disclosure magnifies panoramic digital slides, segments outputs, and makes statistics. The machine panoramic scanning time of each image is 3-4 min, substantially shortening the time.

DETAILED DESCRIPTION

The following examples are intended to illustrate the present disclosure, but not to limit the scope of the present disclosure.

In the present disclosure, unless otherwise specified, all equipment and raw materials used are commercially available or are commonly used in the art. All methods in the following examples, unless otherwise specified, are conventional methods in the art.

The present disclosure provides a method for determining a total number of fibers in a muscle tissue based on panoramic scanning, including the following steps:

panoramically scanning a muscle tissue slide to obtain a panoramic digital slide using a panoramic scanner;

magnifying the panoramic digital slide, and segmenting the panoramic digital slide into N images along the space of muscle fiber bundles, where N is an integer greater than 1; and determining a number of fibers in each image, where a sum of numbers of fibers in the N images is the total number of fibers in the muscle tissue.

In the present disclosure, a muscle tissue slide is panoramically scanned to obtain a panoramic digital slide using a panoramic scanner.

In the present disclosure, the muscle tissue may preferably include muscle tissues of livestock and poultry animals and model animals; the livestock and poultry animals may preferably include chickens, pigs, cattle, goats/sheep, ducks, or geese, and more preferably the chickens; and the model animals may preferably include mice or rats. When the livestock and poultry animals are the chickens, an age of the chickens may preferably be a myogenic period and a muscle maturation period. The technical solutions of the present disclosure are illustrated with the example of a 1-day-old chickling and a 72-week-old adult chicken in the examples of the present disclosure, but cannot be construed as the whole protection scope of the present disclosure. In the present disclosure, the muscle tissue may preferably be one or more selected from the group consisting of pectoralis, thigh/leg muscle, longissimus dorsi, gastrocnemius, and biceps femoris, further preferably the pectoralis or the thigh/leg muscle, and more preferably the pectoralis.

In the present disclosure, the muscle tissue slide may preferably include an H&E-stained slide. In the present disclosure, the muscle tissue slide is preferably prepared according to the following steps: successively subjecting a fresh muscle tissue to fixation with a first fixing solution, block trimming, and fixation with a second fixing solution to obtain a fixed sample; and successively subjecting the fixed sample to a first dehydration, a first permeabilization, embedding, sectioning, section stretch, deparaffinization and rehydration, hematoxylin staining, water washing, rinsing, a second dehydration, eosin counterstaining, a third dehydration, a second permeabilization, and mounting to obtain the muscle tissue slide.

In the present disclosure, the fresh muscle tissue is subjected to the fixation with a first fixing solution. In the present disclosure, the muscle tissue is required to be morphologically intact, without extrusion deformation. In the present disclosure, the first fixing solution may preferably be 4 wt. % paraformaldehyde fixing solution, and the fresh muscle tissue and the paraformaldehyde fixing solution may preferably be in a volume ratio of <1:10, and more preferably 1:10. The volume ratio of <1:10 can effectively fix the fresh muscle tissue. In the present disclosure, fixation time of the first fixing solution may preferably be ≥48 h, and more preferably 48 h.

In the present disclosure, after the fixation with a first fixing solution, a resulting muscle block is preferably trimmed. In the present disclosure, a cross-section thickness of a muscle block obtained by the block trimming may preferably be 1-4 mm, and more preferably 3 mm. In the present disclosure, the block trimming may preferably be performed perpendicular to muscle fibers, and this block trimming method may obtain transverse muscle fibers. In the present disclosure, after the block trimming, a resulting muscle block is preferably subjected to the fixation with a second fixing solution. The second fixing solution may be formalin, and the formalin may preferably have a concentration of 4% by volume. In the present disclosure, fixation time of the second fixing solution may preferably be >1 day, and more preferably 2-5 days. A volume of the second fixing solution is not particularly limited in the present disclosure, as long as a volume of a conventional fixing solution in the art may be used.

In the present disclosure, after the fixation with a second fixing solution, the fixed sample is successively subjected to a first dehydration, a first permeabilization, embedding, sectioning, section stretch, deparaffinization and rehydration, hematoxylin staining, water washing, rinsing, a second dehydration, eosin counterstaining, a third dehydration, a second permeabilization, and mounting to obtain the muscle tissue slide.

If the muscle tissue is a muscle tissue in the myogenic period, the first dehydration in the present disclosure may preferably include the following procedure: successively soaking the fixed sample in 20% vol ethanol for 1 h, 30% vol ethanol for 1 h, 40% vol ethanol for 1 h, 50% vol ethanol for 1 h, 60% vol ethanol for 1 h, 70% vol ethanol for 12 h, 80% vol ethanol for 3 h, 95% vol ethanol for 3 h, 95% vol ethanol for 3 h, and 95% vol ethanol for 3 h. In the present disclosure, ethanol gradient setting in the first dehydration procedure may solve the problems of young age of young animals and uneasy dehydration of muscles. For example, in the examples of the present disclosure, when the total number of fibers in a muscle tissue of a one-day-old chickling is determined, the foregoing dehydration procedure is used, and water is successfully dehydrated from the muscle tissue.

In the present disclosure, if the muscle tissue is a muscle tissue in the muscle maturation period, the first dehydration in the present disclosure may include the following procedure: successively soaking the fixed sample in 70% vol ethanol for 3 h, 85% vol ethanol for 3 h, 95% vol ethanol for 3 h, 95% vol ethanol for 3 h, 100% vol ethanol for 3 h, 100% vol ethanol for 3 h, and 100% vol ethanol for 2 h.

In the present disclosure, specific steps of the first permeabilization, the embedding, the sectioning, the section stretch, the deparaffinization and rehydration, the hematoxylin staining, the water washing, the rinsing, the second dehydration, the eosin counterstaining, the third dehydration, the second permeabilization, and the mounting after the first dehydration are not particularly limited, and conventional steps of paraffin section preparation of muscle tissues in the art may be followed.

In the present disclosure, the muscle tissue slide may preferably be 1-4 μm and more preferably 3 μm in thickness.

In the present disclosure, after the muscle tissue slide is obtained, the muscle tissue slide is panoramically scanned to obtain a panoramic digital slide using a panoramic scanner. The source and model of the panoramic scanner are a conventional panoramic scanner in the art may be used. A process of the panoramic scanning and a magnification power of an objective lens are not particularly limited in the present disclosure, as long as the slide is automatically focused.

After the panoramic digital slide is obtained, the panoramic digital slide is magnified, and segmented into N images along the space of muscle fiber bundles, where N is an integer greater than 1. In the present disclosure, a magnification power may preferably be in the range of 1× to 80×, and more preferably 10× to 40×. In the present disclosure, the N may preferably be adjusted based on the magnification power and the definition of muscle fibers in an image and be subject to a condition that the muscle fibers in the image are clearly recognized.

In the present disclosure, a number of fibers in each image is determined, where a sum of numbers of fibers in the N images is the total number of fibers in a muscle tissue. In the present disclosure, statistics are preferably made on the muscle fiber in each output image using image statistical software, and the statistics are automatic statistics in the image statistical software.

In the method provided by the present disclosure, the muscle tissue slide is panoramically scanned to obtain the panoramic digital slide using the panoramic scanner, and the panoramic digital slide obtained is segmented, counted and summed to realize the statistical effect on the total number of fibers in the whole muscle tissue. The method has a smaller error, obtains a more accurate result, and is closer to actual value.

Based on the foregoing advantages of the method, the present disclosure further provides use of the method according to the foregoing technical solution in any one or more of meat quality evaluation, livestock and poultry breeding, and scientific research on livestock and poultry meat quality, and more preferably use thereof in the quality evaluation and the livestock and poultry breeding. A specific process of the use is not particularly limited in the present disclosure, as long as all conditions that the method for determining a total number of fibers in a muscle tissue based on panoramic scanning in the present disclosure is used in the foregoing use fall within the protection range of the present disclosure.

In order to further illustrate the present disclosure, the technical solutions provided by the present disclosure will be described in detail below in conjunction with accompanying drawings and examples, but they should not be construed as limiting the protection scope of the present disclosure.

Example 1

Figure 1:
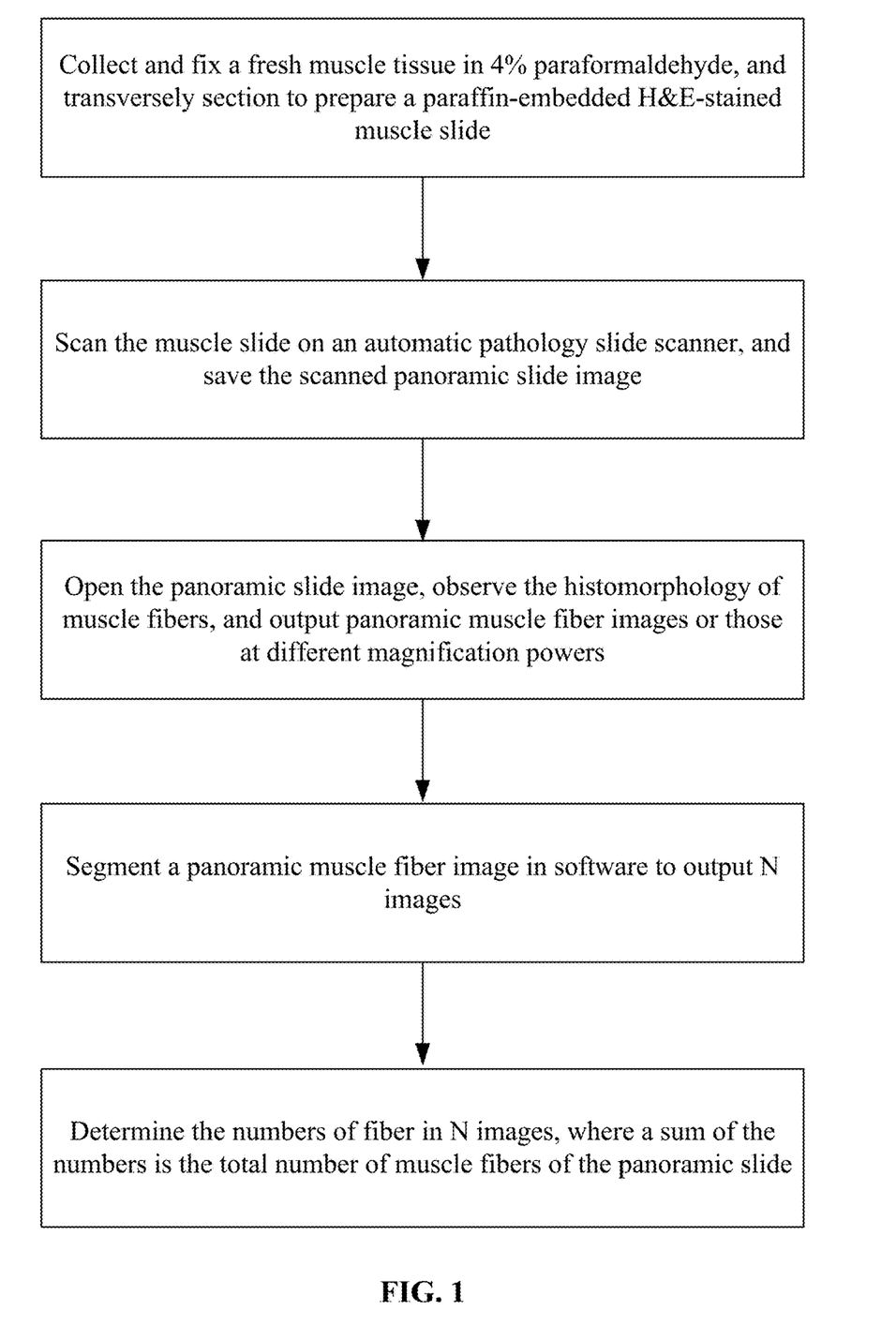
FIG. 1 illustrates a technical route of a method for determining a total number of fibers in a muscle tissue based on panoramic scanning in Example 1.

The total number of fibers in the 1-day-old chickling muscle tissue was determined according to the following steps. The technical route in the determination process is shown in FIG. 1:

1) Preparation of a 1-Day-Old Chickling Muscle Tissue Slide:

The 1-day-old chickling was sacrificed by cervical dislocation. The chest muscle with breastbone was taken down carefully using eye scissors and tweezers. The muscle was tweezered and placed in normal saline to flush away down feathers, and immediately put in a 4 wt. % paraformaldehyde fixing solution for first fixation. The fixation time was 72 h. The muscle sample and the 4 wt. % paraformaldehyde fixing solution were in a volume ratio of <1:10.

After the first fixation was completed, the muscle tissue sample was taken out and trimmed perpendicular to muscle fibers. The muscle block was about 3 mm in thickness. The trimmed block was put in an embedding box, and the cross section of the muscle desired in the test was put down. The embedding box was covered tightly and put in a large beaker with 4% vol formalin and fixed for 2 days. The embedding box was removed from the big beaker and dehydrated. The dehydration procedure was as follows: the muscle block was successively soaked in 20% vol ethanol for 1 h, 30% vol ethanol for 1 h, 40% vol ethanol for 1 h, 50% vol ethanol for 1 h, 60% vol ethanol for 1 h, 70% vol ethanol overnight (for 12 h), 80% vol ethanol for 3 h, 95% vol ethanol for 3 h, 95% vol ethanol for 3 h, and 95% vol ethanol for 3 h to dehydrate the tissue sample.

After dehydration, the tissue sample was soaked in paraffins I, II, and III for 1 h, respectively. Subsequently, paraffin melted at 60° C. was poured into a mold to embed the sample. Notably, the cross section was perpendicular to muscle fibers. The sample was placed next to the mold. After paraffin solidified at room temperature, the mold was placed in a −20° C. refrigerator, let stand for 5 min to cool down, and stripped. The paraffin-embedded tissue block was sliced on a microtome, and the section thickness was 3 μm. Thin paraffin-embedded tissue sections were placed in a 39° C. thermostat water bath. Once floating paraffin-embedded sections were stretched, numbered glass slides were inserted into water. Once thin paraffin-embedded tissue sections adhered to the glass slides, samples were labeled.

Figure 2:
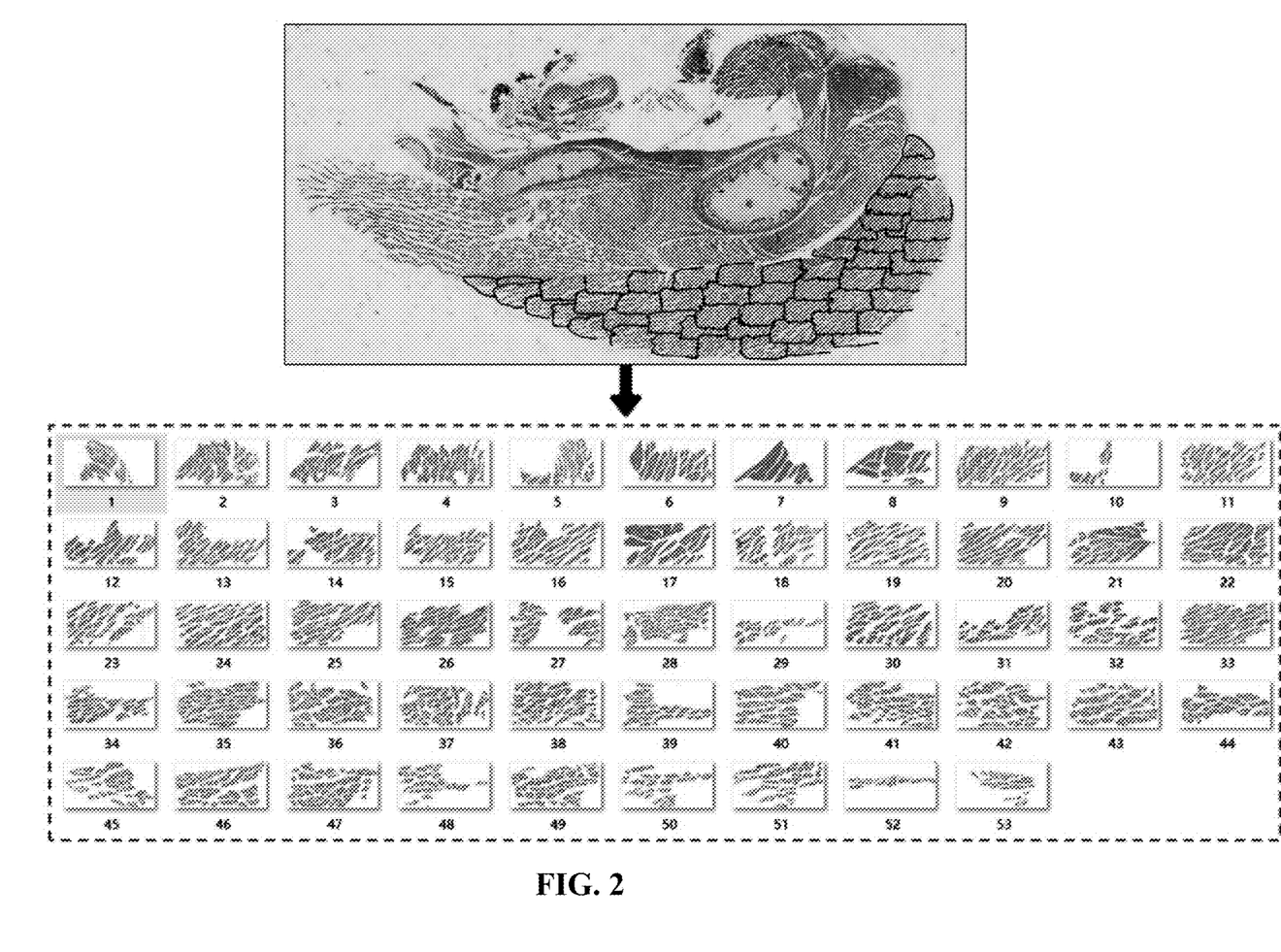
FIG. 2 shows output maps of a panoramic digital slide and 53 segmented images in Example 1.

Well-prepared tissue sections were baked on a slide drier at 60° C. for 2 h, and baked sections were placed in a slide basket for H&E staining; after staining, glass slides were taken out, excess liquid was wiped up; a drop of permount was added dropwise on each tissue section, the tissue section was covered with a coverslip, compacted to prevent bubbles, and air-dried in a fume hood. Thus, slide preparation was completed (as shown in FIG. 2). A standard cross section of muscle fibers was clearly observed in a well-prepared muscle slide, so as to facilitate statistics of related histological characteristics after subsequent panoramic scanning.

2) Panoramic Scanning and Data Statistics:

Panoramic scanning of the slide was completed using a KF-PRO-020 Digital Pathology Slide Scanner. In order to improve slide scan image quality, the slide was required to check and clean before scan.

Specifically: the slide was wiped carefully with a superfine fiber wiper, which could effectively eliminate dust, water stains, or fingerprints on the upper and lower surface; for stains that were difficult to eliminate, the slide was soaked in water or alcohol, wiped up, and mounted on the scanner after it was fully dried, for fear that the residual liquid entered into the scanner.

After the slide was cleaned up, the scan was ready. The scanner was turned on, the button was clicked on to eject an object stage, and the slide was mounted on the object stage carefully to avoid massive defocused areas during the scan. After the image was previewed on the scanner, the size of scanning area could be seen. The button was clicked on to start scanning. The instrument would focus automatically. Alternatively, manual focus was selected as required. Visual field changes indicated a scanning progress. After the scan, a panoramic image could be clicked to view and check, and a panoramic digital slide was checked correctly and saved. The eject button was clicked, the object stage was removed from the scanner, the muscle slide was taken down, the instrument was turned off, and the scan was completed.

The saved panoramic digital slide was opened in K-Viwer software on the computer. The mouse wheel was scrolled to magnify the panoramic slide to 40× magnification and the histomorphology of muscle fibers was observed.

In K-Viwer software, using a Marking Brush along the space of muscle fiber bundles, the panoramic digital slide was segmented into 53 images that were recognizable in image statistics software and at a proper magnification power, and these images were output (FIG. 2). The software automatically recognized and made statistics on the muscle a number of fibers in each image, and a sum of these muscle fiber was the total number of fibers in the muscle tissue of the corresponding slide. The results are shown in Table 1.

TABLE 1

Determination results of the total number of fibers in a 1-day-old chickling muscle tissue in Example 1

| ID | Number (fiber) |
|---|---|
| 1 | 3,188 |
| 2 | 5,343 |
| 3 | 5,359 |
| 4 | 5,163 |
| 5 | 2,901 |
| 6 | 4,836 |
| 7 | 2,597 |
| 8 | 3,397 |
| 9 | 7,037 |
| 10 | 1,528 |
| 11 | 5,738 |
| 12 | 4,773 |
| 13 | 4,839 |
| 14 | 4,517 |
| 15 | 4,673 |
| 16 | 5,563 |
| 17 | 5,327 |
| 18 | 4,791 |
| 19 | 4,903 |
| 20 | 5,421 |
| 21 | 4,291 |
| 22 | 6,637 |
| 23 | 4,901 |
| 24 | 6,389 |
| 25 | 5,342 |
| 26 | 5,937 |
| 27 | 4,689 |
| 28 | 4,933 |
| 29 | 1,797 |
| 30 | 6,111 |
| 31 | 3,253 |
| 32 | 4,861 |
| 33 | 6,520 |
| 34 | 4,226 |
| 35 | 5,904 |
| 36 | 6,193 |
| 37 | 5,520 |
| 38 | 6,885 |
| 39 | 4,042 |
| 40 | 5,445 |
| 41 | 5,932 |
| 42 | 5,556 |
| 43 | 6,497 |
| 44 | 4,738 |
| 45 | 4,179 |
| 46 | 5,694 |
| 47 | 6,439 |
| 48 | 3,283 |
| 49 | 5,528 |
| 50 | 3,396 |
| 51 | 4,767 |
| 52 | 1,173 |
| 53 | 1,719 |
| / | / |
| Total | 254,691 |

It can be concluded from FIG. 2 and Table 1 that: a total of 53 images are output by the method in Example 1, and the total number of fibers in a 1-day-old chickling muscle tissue is calculated as 254,691 fibers.

Comparative Example 1

Figure 3:
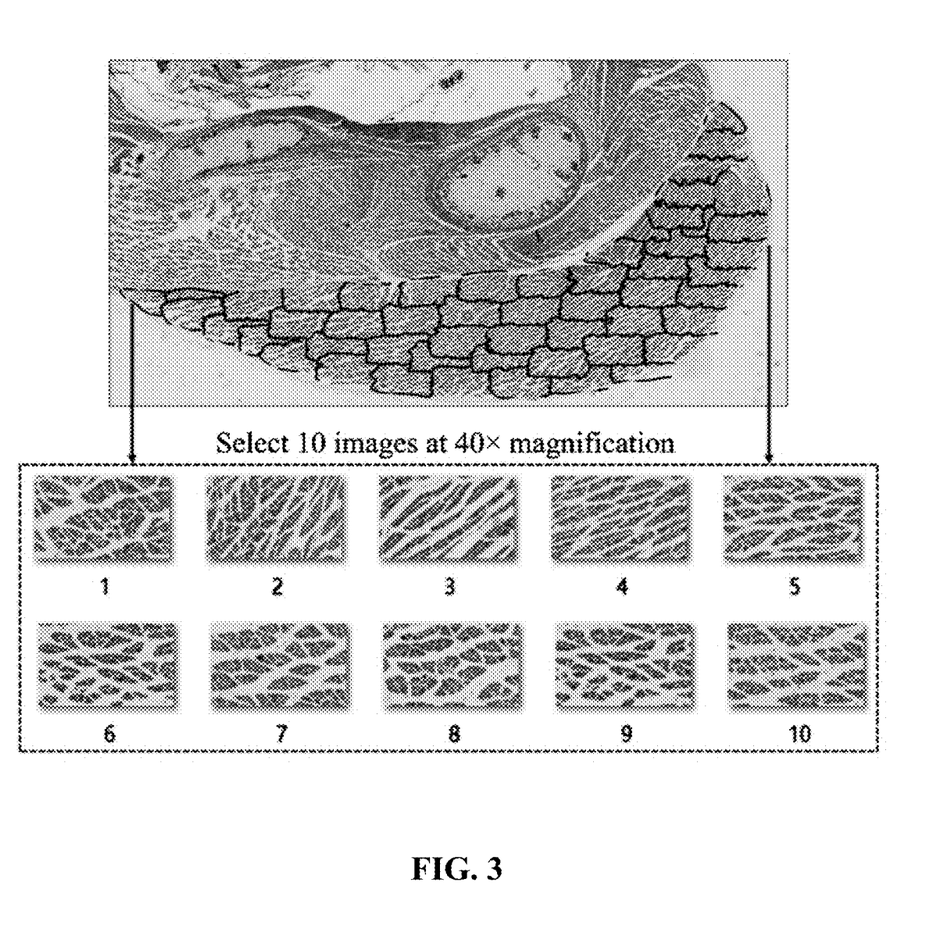
FIG. 3 shows output maps of a panoramic digital slide and 10 selected local images in Comparative Example 1.

The total number of fibers in the 1-day-old chickling muscle tissue was determined by the conventional method, and steps were as follows:

The total number of fibers in the muscle tissue slide in step 1) of Example 1 was estimated by the conventional estimation method, and steps were as follows: a conventional process of observing the slide and selecting 10 local images for statistics under optical microscope was replaced with a method for randomly selecting 10 local images from the panoramic digital slide (40× magnification) obtained in step 2) of Example 1. The selected 10 local images are shown in FIG. 3.

Ten local images were imported into ImageJ software, and 10 average muscle fiber densities were calculated. Herein, muscle fiber density of single image=muscle fiber/area of single image*100%, and average muscle fiber density=sum of muscle fiber densities of 10 images/10, where the muscle fiber and the area of single image could be obtained by automatic recognition in ImageJ software, which were multiplied by the area of pectoralis major in the panoramic digital slide (total area of segmented zones in FIG. 3) to obtain the total muscle fiber. The results are shown in Table 2.

TABLE 2

Determination results of the total number of fibers in a one-day-old chickling muscle tissue in Comparative Example 1

| ID | Number of fibers | Field of view area (mm²) | Density (fiber/mm²) |
|---|---|---|---|
| 1 | 3,498 | 0.0926 | 37,769.86 |
| 2 | 3,778 | 0.0926 | 40,793.17 |
| 3 | 2,793 | 0.0926 | 30,157.58 |
| 4 | 3,475 | 0.0926 | 37,521.51 |
| 5 | 3,270 | 0.0926 | 35,308.02 |
| 6 | 3,054 | 0.0926 | 32,975.74 |
| 7 | 3,587 | 0.0926 | 38,730.84 |
| 8 | 3,248 | 0.0926 | 35,070.47 |
| 9 | 3,068 | 0.0926 | 33,126.91 |
| 10 | 3,074 | 0.0926 | 33,191.69 |

It can be concluded from FIG. 3 and Table 2 that: as estimated by the method in Example 1, the average density of the 1-day-old chickling muscle tissue is 35,464.58 fibers/mm², the total area of muscle fibers is 9.0761 mm², and the total muscle fiber is 321,880 fibers.

Comparison Example 1

The total number of fibers in the same 1-day-old chickling muscle tissue sample was determined. The results obtained by two methods in Example 1 and Comparative Example 1 were 254,691 and 321,880 fibers, respectively. The difference between both results was 67,189 fibers. The error rate of the total number of fibers determined by both methods was 26.38%.

Example 2

Figure 4:
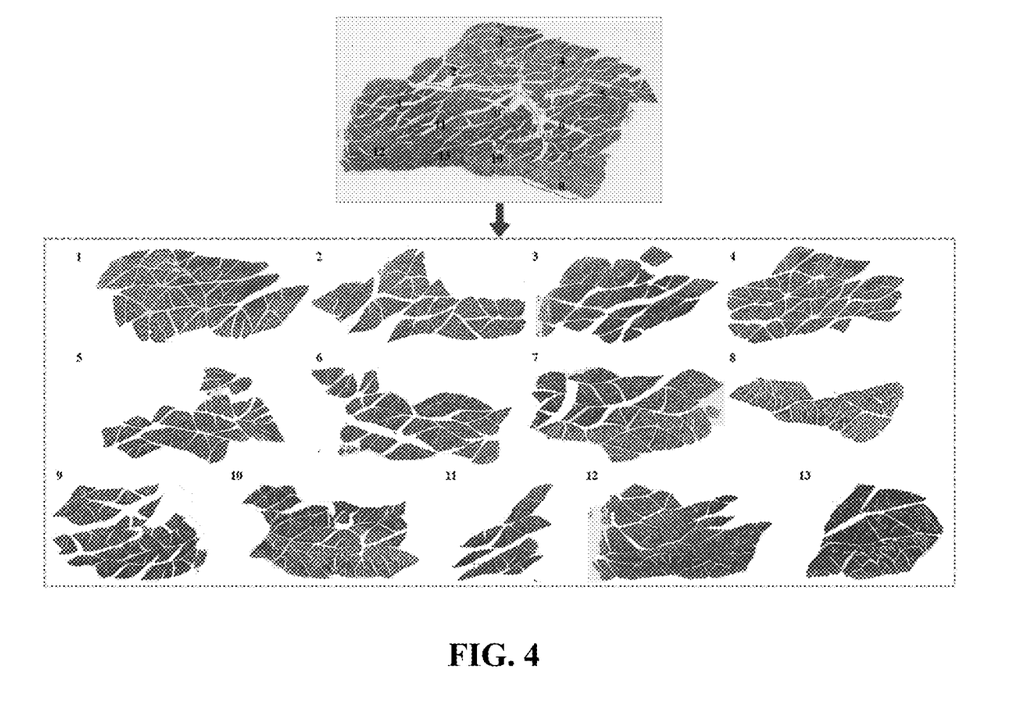
FIG. 4 shows output maps of a panoramic digital slide and 13 segmented images in Example 2.

The total number of fibers in the adult chicken (72-week-old) muscle tissue was determined, and steps were as follows:
Preparation of a 72-Week-Old Adult Chicken Muscle Tissue Slide:

A 72-week-old adult chicken muscle tissue slide was prepared by the method for preparing the one-day-old chickling muscle tissue slide in step 1) of Example 1. The difference was that the dehydration procedure was as follows: the muscle block was successively soaked in 70% vol ethanol for 3 h, 85% vol ethanol for 3 h, 95% vol ethanol for 3 h, 95% vol ethanol for 3 h, 100% vol ethanol for 3 h, 100% vol ethanol for 3 h, and 100% vol ethanol for 2 h to obtain the 72-week-old adult chicken muscle tissue slide.
Panoramic Scanning and Data Statistics:

Panoramic scanning and data statistics were carried out by the method in step 2) of Example 2. The difference was that the panoramic digital slide obtained was segmented into 13 images after 10× magnification (FIG. 4). The total muscle fiber obtained by statistics is shown in Table 3.

TABLE 3

Determination results of the total number of fibers in a 72-week-old adult chicken muscle tissue in Example 2

| ID | Number of fibers |
|---|---|
| 1 | 3,937 |
| 2 | 3,894 |
| 3 | 4,525 |
| 4 | 4,909 |
| 5 | 3,359 |
| 6 | 3,800 |
| 7 | 3,962 |
| 8 | 1,844 |
| 9 | 4,993 |
| 10 | 4,488 |
| 11 | 2,255 |
| 12 | 5,008 |
| 13 | 2,345 |
| Total number of fibers | 49,319 |

It can be concluded from FIG. 4 and Table 3 that: a total of 13 images are output by the method in Example 2, and the total number of fibers in a 72-week-old adult chicken muscle tissue is calculated as 49,319 fibers.

Comparative Example 2

Figure 5:
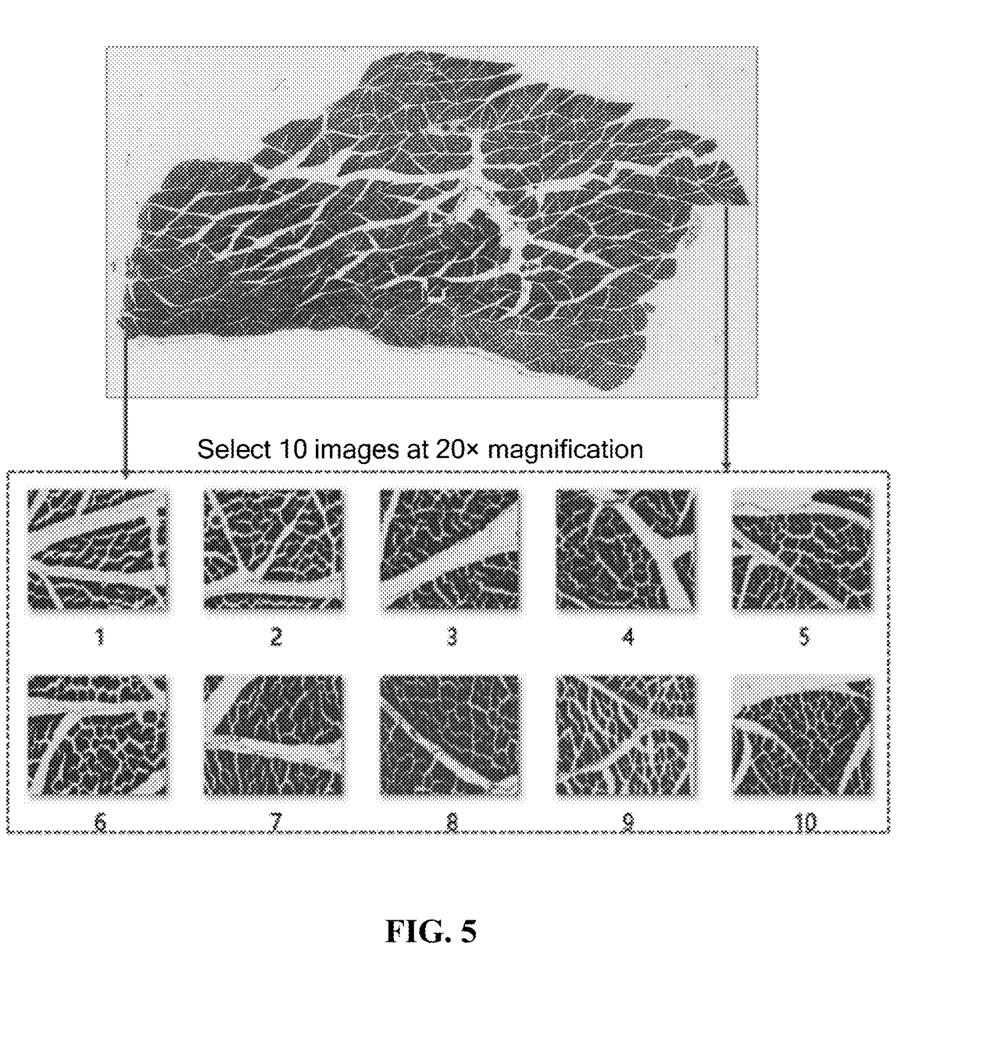
FIG. 5 shows output maps of a panoramic digital slide and 10 selected local images in Comparative Example 2.

The total number of fibers in the 72-week-old adult chicken muscle tissue was determined by the conventional method, and steps were as follows:

The total muscle fiber in the muscle tissue slide in step 1) of Example 2 was estimated by the conventional estimation method: a conventional process of observing the slide and selecting 10 local images for statistics under optical microscope was replaced with a method for randomly selecting 10 local images from the panoramic digital slide (10× magnification) obtained in step 2) of Example 2. The selected 10 local images are shown in FIG. 5.

Ten local images were imported into ImageJ software, and 10 average muscle fiber densities were calculated, which were multiplied by the area of pectoralis major in the panoramic digital slide (total area in FIG. 5) to obtain the total muscle fiber. The results are shown in Table 4.

TABLE 4

Determination results of the total number of fibers in a 72-week-old adult chicken muscle tissue in Comparative Example 2

| ID | Number of fibers | Field of view area (mm²) | Density (fiber/mm²) |
|---|---|---|---|
| 1 | 147 | 0.5876 | 250.17 |
| 2 | 181 | 0.5876 | 308.04 |
| 3 | 183 | 0.5876 | 311.44 |
| 4 | 195 | 0.5876 | 331.86 |
| 5 | 178 | 0.5876 | 302.93 |
| 6 | 169 | 0.5876 | 287.61 |
| 7 | 164 | 0.5876 | 279.10 |
| 8 | 181 | 0.5876 | 308.04 |
| 9 | 165 | 0.5876 | 280.81 |
| 10 | 171 | 0.5876 | 292.02 |

It can be concluded from FIG. 5 and Table 4 that: as estimated by the method in Comparative Example 2, the average density of the 72-week-old adult chicken muscle tissue is 285.10 fibers/mm², the total area of muscle fibers is 206.10 mm², and the total number of fibers is 60,820 fibers.

Comparison Example 2

The total number of fibers in the same 72-week-old adult chicken muscle tissue sample was determined. The results obtained by two methods in Example 2 and Comparative Example 2 were 49,319 and 60,820 fibers, respectively. The difference between both results was 11,501 fibers. The error rate of the total number of fibers determined by both methods was 23.32%.

Verification Example 1

Figure 6:
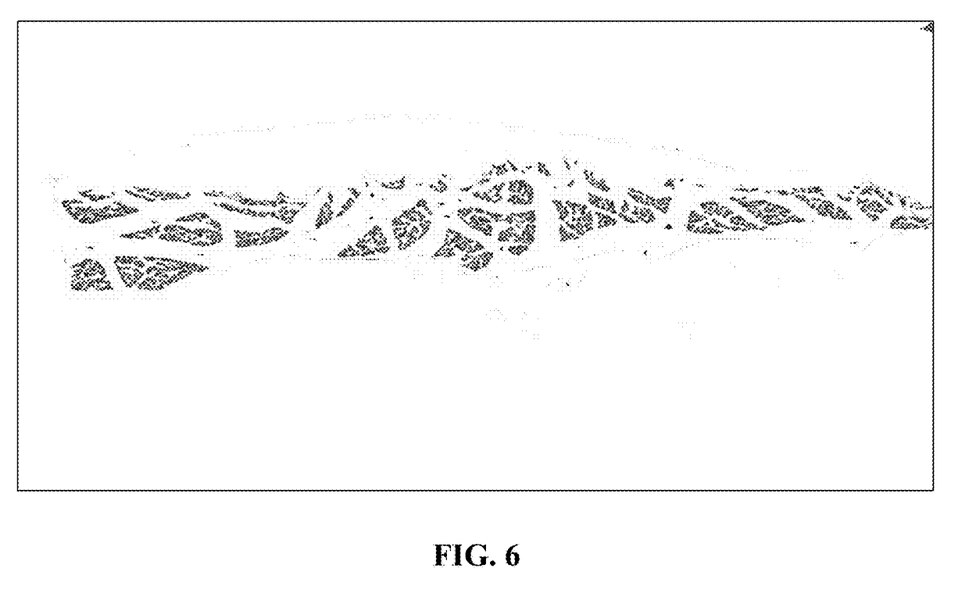
FIG. 6 shows an output map of image 52 in Photoshop image software in Verification Example 1.
Figure 7:
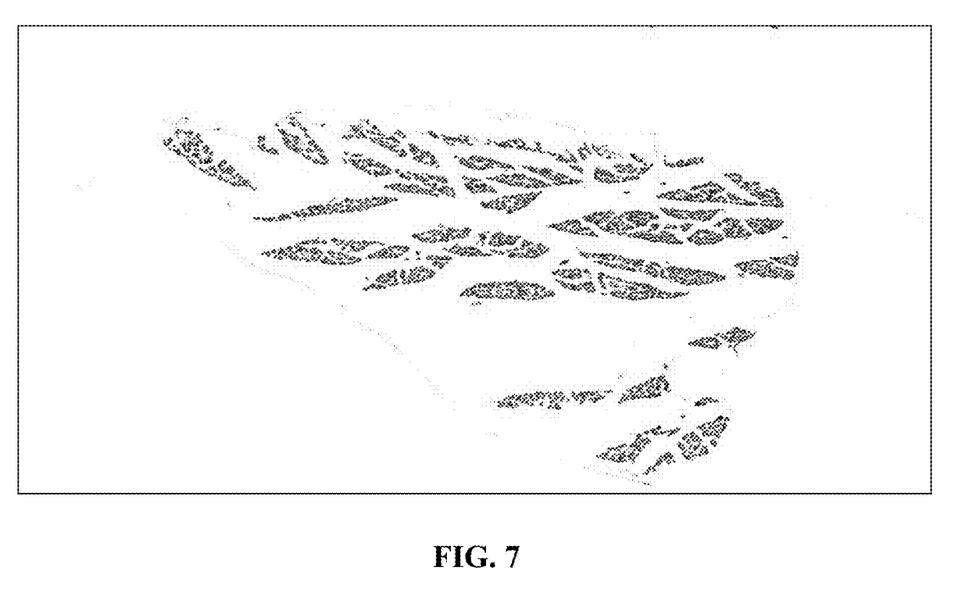
FIG. 7 shows an output map of image 53 in Photoshop image software in Verification Example 1.

In order to verify the accuracy of the method for determining the total number of fibers in the muscle tissue in the present disclosure, images 52 and 53 randomly selected from the 53 images output in Example 1 were imported into Photoshop image software (FIGS. 6 to 7) for manual counting. The results are shown in Table 5.

TABLE 5

Fibers in the muscle tissue in images 52 and 53 determined by different methods

| ID | Method in Example 1/fiber | Manual counting/fiber | Error rate |
|---|---|---|---|
| 52 | 1173 | 1210 | 3.15% |
| 53 | 1719 | 1625 | −5.47% |

From Table 5: the errors of fibers in muscle tissues 52 and 53 obtained by the method in the present disclosure versus those obtained by the manual counting method are 3.15% and −5.47%, respectively. These errors are small and significantly smaller than those in Comparative Examples 1 and 2, indicating that the method in the present disclosure is relatively accurate.

It can be concluded from the above examples that: the total muscle fiber obtained by the method in the present disclosure is substantially close to the actual value, and the error between the total muscle fiber obtained by the conventional estimation method and the actual value is at least 20%; since the method in the present disclosure determines the number of all muscle fibers in the whole muscle tissue slide, the error only comes from the statistical error of the image processing software, which was small. However, the conventional estimation method for multiplying the average muscle fiber density by the total area of the slide has an extremely large error. The main reason is that there is a limitation in the field of view of the local image for statistics of muscle fiber density, and that selected local images are fewer, which cannot represent the muscle fiber density of the whole slide. Furthermore, the method in the present disclosure can replace the conventional estimation method to determine the total muscle fiber, which is of great importance for the statistics of the muscle fiber in livestock and poultry muscles and the research on quality.

Although the present disclosure has been described in detail above with general description and specific embodiments, some modifications or improvements can be made on the basis of the present disclosure, which will be apparent to those skilled in the art. Therefore, all of these modifications or improvements made without departing from the spirit of the present disclosure fall within the claimed scope of the present disclosure.

What is claimed is:

1. A method for determining a total number of fibers in a muscle tissue based on panoramic scanning, comprising:
   panoramically scanning a muscle tissue slide to obtain a panoramic digital slide using a panoramic scanner;
   magnifying the panoramic digital slide, and segmenting the panoramic digital slide into N images along the space of muscle fiber bundles, wherein N is an integer greater than 1; and
   determining a number of fibers in each image;
   wherein:
   a sum of numbers of fibers in the N images is the total number of fibers in the muscle tissue, wherein the muscle tissue slide is a hematoxylin-eosin (H&E) stained slide;
   the muscle tissue slide is prepared according to the following:
      successively subjecting a fresh muscle tissue to fixation with a first fixing solution, block trimming, and fixation with a second fixing solution to obtain a fixed sample; and
      successively subjecting the fixed sample to a first dehydration, a first permeabilization, embedding, sectioning, section stretch, deparaffinization and rehydration, hematoxylin staining, water washing, rinsing, a second dehydration, eosin counterstaining, a third dehydration, a second permeabilization, and mounting to obtain the muscle tissue slide; and
   if the fresh muscle tissue is a muscle tissue in a myogenic period, the first dehydration comprises the following procedure: successively soaking the fixed sample in 20% vol ethanol for 1 h, 30% vol ethanol for 1 h, 40% vol ethanol for 1 h, 50% vol ethanol for 1 h, 60% vol ethanol for 1 h, 70% vol ethanol for 12 h, 80% vol ethanol for 3 h, 95% vol ethanol for 3 h, 95% vol ethanol for 3 h, and 95% vol ethanol for 3 h.

2. The method of claim 1, wherein a magnification power is in the range of 1× to 80×.

3. The method of claim 2, wherein the muscle tissue is one or more selected from the group consisting of pectoralis, thigh/leg muscle, longissimus dorsi, gastrocnemius, and biceps femoris.

4. The method of claim 1, wherein the muscle tissue comprises muscle tissues of livestock and poultry animals and model animals.

5. The method of claim 4, wherein the livestock and poultry animals comprise chickens, pigs, cattle, goats/sheep, ducks, or geese; and the model animals comprise mice or rats.

6. The method of claim 5, wherein the livestock and poultry animals are the chickens.

7. The method of claim 6, wherein a muscle development period of the chickens comprises a myogenic period and a muscle maturation period.

8. The method of claim 4, wherein the muscle tissue is one or more selected from the group consisting of pectoralis, thigh/leg muscle, longissimus dorsi, gastrocnemius, and biceps femoris.

9. The method of claim 1, wherein the muscle tissue is one or more selected from the group consisting of pectoralis, thigh/leg muscle, longissimus dorsi, gastrocnemius, and biceps femoris.

10. The method of claim 1, wherein the first fixing solution is a 4 wt. % paraformaldehyde fixing solution, and fixation time is >48 h.

11. The method of claim 10, wherein the fresh muscle tissue and the first fixing solution are in a volume ratio of <1:10.

12. The method of claim 1, wherein the second fixing solution is a 4% vol formalin, and fixation time is >1 day.

13. The method of claim 1, wherein a cross-section thickness of a muscle block obtained by the block trimming is 1-4 mm.

14. The method of claim 1, wherein the slide is 1-4 μm in thickness.

15. A method for meat quality evaluation, livestock and poultry breeding, and scientific research on livestock and poultry meat quality, comprising using the method of claim 1.

16. A method for determining a total number of fibers in a muscle tissue based on panoramic scanning, comprising:
   panoramically scanning a muscle tissue slide to obtain a panoramic digital slide using a panoramic scanner;
   magnifying the panoramic digital slide, and segmenting the panoramic digital slide into N images along the space of muscle fiber bundles, wherein N is an integer greater than 1; and
   determining a number of fibers in each image, wherein a sum of numbers of fibers in the N images is the total number of fibers in the muscle tissue;

wherein:
   the muscle tissue slide is a hematoxylin-eosin (H&E) stained slide;
   the muscle tissue slide is prepared according to the following:
      successively subjecting a fresh muscle tissue to fixation with a first fixing solution, block trimming, and fixation with a second fixing solution to obtain a fixed sample; and
      successively subjecting the fixed sample to a first dehydration, a first permeabilization, embedding, sectioning, section stretch, deparaffinization and rehydration, hematoxylin staining, water washing, rinsing, a second dehydration, eosin counterstaining, a third dehydration, a second permeabilization, and mounting to obtain the muscle tissue slide; and
   if the fresh muscle tissue is a muscle tissue in a muscle maturation period, the first dehydration comprises the following procedure: successively soaking the fixed sample in 70% vol ethanol for 3 h, 85% vol ethanol for 3 h, 95% vol ethanol for 3 h, 95% vol ethanol for 3 h, 100% vol ethanol for 3 h, 100% vol ethanol for 3 h, and 100% vol ethanol for 2 h.

* * * * *